US008711665B1

(12) United States Patent
Abdul Hamid

(10) Patent No.: US 8,711,665 B1
(45) Date of Patent: Apr. 29, 2014

(54) METHOD AND APPARATUS FOR DETERMINING STORAGE CAPACITY ERROR FOR A DATA STORAGE DEVICE

(75) Inventor: Hasni Zaidy Abdul Hamid, Kuala Lumpur (MY)

(73) Assignee: Western Digital Technologies, Inc., Irvine, CA (US)

( * ) Notice: Subject to any disclaimer, the term of this patent is extended or adjusted under 35 U.S.C. 154(b) by 224 days.

(21) Appl. No.: 13/282,274

(22) Filed: Oct. 26, 2011

(51) Int. Cl.
*G11B 7/00* (2006.01)
*G11B 5/09* (2006.01)
*G11B 20/18* (2006.01)

(52) U.S. Cl.
USPC .................. 369/44.32; 369/44.33; 369/47.14; 369/53.15; 369/53.17

(58) Field of Classification Search
USPC ........... 369/44.32, 44.33, 47.14, 53.15, 53.17
See application file for complete search history.

(56) References Cited

U.S. PATENT DOCUMENTS

| | | |
|---|---|---|
| 5,917,724 A | 6/1999 | Brousseau et al. |
| 6,034,831 A | 3/2000 | Dobbek et al. |
| 6,078,452 A | 6/2000 | Kittilson et al. |
| 6,204,660 B1 | 3/2001 | Lee |
| 6,223,303 B1 | 4/2001 | Billings et al. |
| 6,408,406 B1 | 6/2002 | Parris |
| 6,563,776 B1 | 5/2003 | Oi et al. |
| 6,717,758 B2 | 4/2004 | Adams et al. |
| 6,985,319 B2 | 1/2006 | Yip et al. |
| 7,072,129 B1* | 7/2006 | Cullen et al. .................... 360/31 |
| 7,139,145 B1 | 11/2006 | Archibald et al. |
| 7,245,445 B2 | 7/2007 | Lee |
| 8,054,717 B1 | 11/2011 | Yang et al. |
| 2002/0191319 A1* | 12/2002 | Liew et al. ...................... 360/53 |
| 2004/0158769 A1 | 8/2004 | Park |
| 2006/0056088 A1 | 3/2006 | Kudoh et al. |
| 2007/0146921 A1 | 6/2007 | Jun |
| 2008/0270675 A1* | 10/2008 | Nagaraj et al. ................ 711/100 |
| 2010/0315916 A1* | 12/2010 | Takahashi et al. ......... 369/47.14 |

* cited by examiner

*Primary Examiner* — Aneeta Yodichkas

(57) ABSTRACT

A data storage device comprising a non-volatile media including a plurality of segments, and configured to store a defect list, and a controller configured to perform a defect management process. The defect management process can include testing the plurality of segments for defects, detecting a defect in a first segment of the plurality of segments, updating the defect list to include the first segment, determining a defective space amount based on the segments in the updated defect list, determining whether the defective space amount indicates a storage capacity error, transmitting a storage capacity error signal to the test system when the defective space amount indicates the storage capacity error, and when the defective space amount does not indicate the storage capacity error, continuing to test the plurality of segments for defects until the defective space amount indicates the storage capacity error or all the segments have been tested.

38 Claims, 10 Drawing Sheets

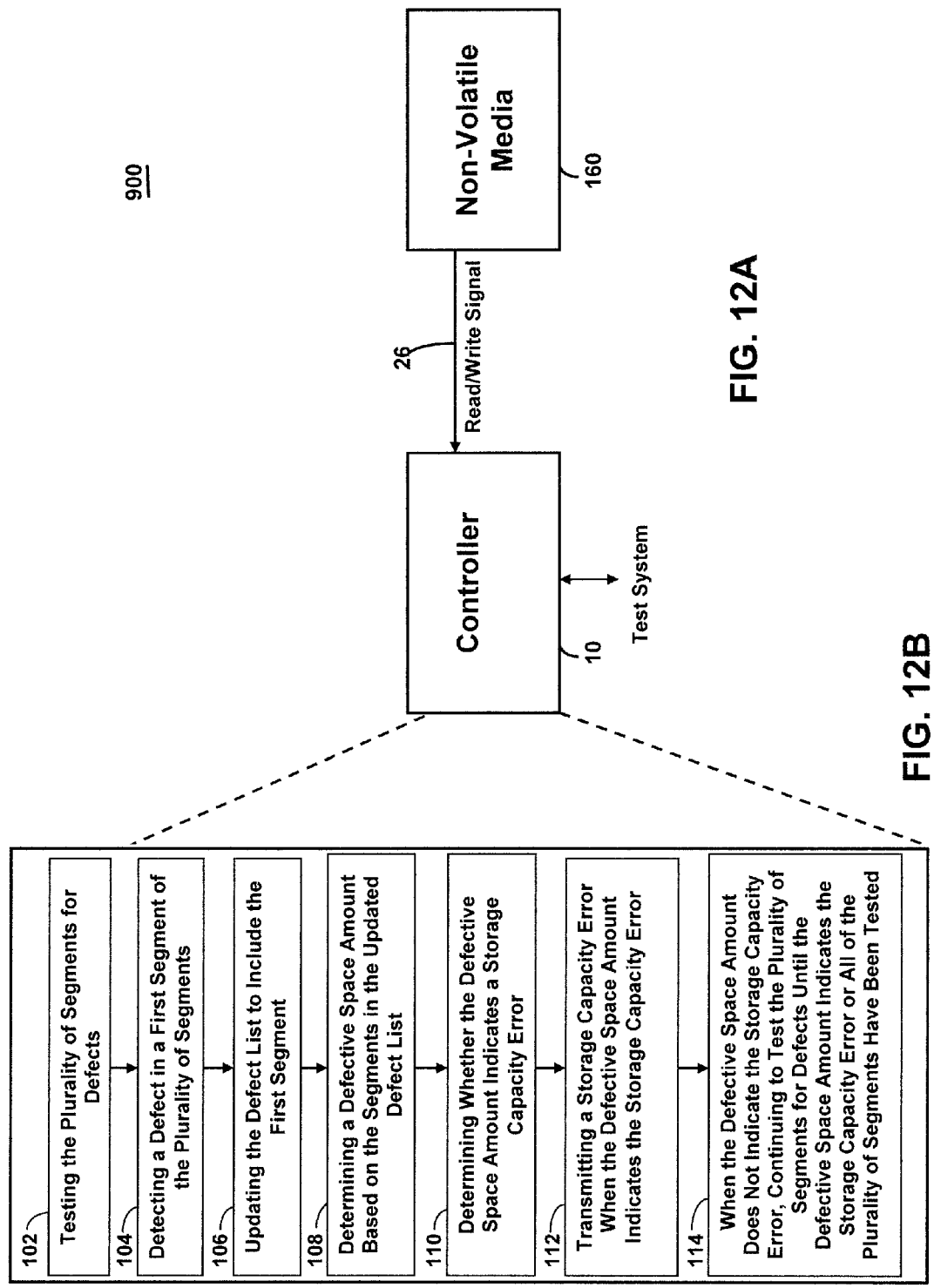

METHOD AND APPARATUS FOR DETERMINING STORAGE CAPACITY ERROR FOR A DATA STORAGE DEVICE

BACKGROUND

A data storage device, such as a disk drive, includes a disk that is coated with a magnetic material which is magnetized with a write element (e.g., a write coil) in order to record information onto the surface of the disk. Various influences may render portions of the disk surface defective, for example, if the magnetic coating is not evenly applied to the disk surface, or if a particle contaminates the magnetic coating. During a manufacturing procedure, the disk drive may be hooked up to a test system and the defective areas of the disk and certain areas adjacent the defective areas (i.e., unusable areas) are located and "mapped out" so that they are not used during normal operation. These defective and unusable areas can reduce a storage capacity of the disk. The disk, however, may need to have a minimum amount of storage capacity.

During a formatting process an amount of space used by the defective and unusable areas of the disk dictates whether there is enough storage capacity in the disk. When the amount of space used by the defective and unusable areas exceeds a predetermined threshold, there is a storage capacity error. When the disk drive determines that there is a storage capacity error during the formatting process, disk drive will transmit a storage capacity error signal to the test system.

Since the discovery of the storage capacity error occurs during the formatting process, the disk drive could be connected to the test system for a long time before the storage capacity error is discovered. This can limit an amount of disk drives tested by the test system.

BRIEF DESCRIPTION OF THE DRAWINGS

The features and advantages of the present embodiments of the present invention will become more apparent from the detailed description set forth below when taken in conjunction with the drawings, wherein:

FIG. 12A depicts a data storage device according to an embodiment of the present invention; and FIG. 12B depicts a defect management process according to an embodiment of the present invention.

DETAILED DESCRIPTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
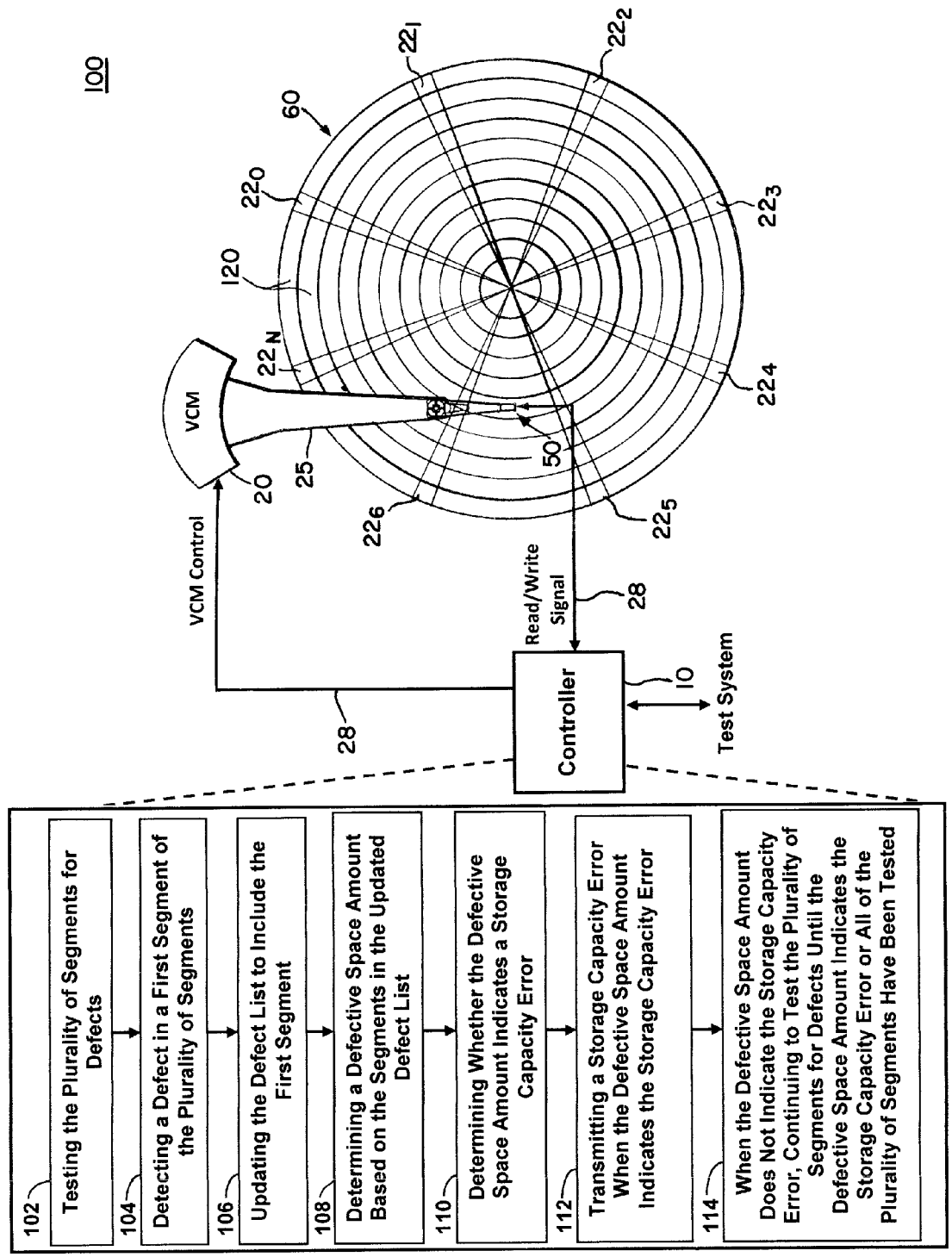
FIG. 1A depicts a data storage device according to an embodiment of the present invention.
FIG. 1B depicts a defect management process according to an embodiment of the present invention.

In an embodiment, as seen in FIG. 1A, a data storage device 100 comprises a rotating magnetic disk 60 and a head 50 connected to the distal end of an actuator arm 25. The actuator arm 25 is rotated about a pivot by a voice coil motor (VCM) 20 to position the head 50 radially over the disk 60. The data storage device 100 also includes a spindle motor (not shown) for rotating the disk during read/write operations.

The data storage device 100 also comprises a controller 10 that performs various operations of the data storage device 100 described herein. The controller 10 may be implemented using one or more processors for executing instructions and may further include memory, such as a volatile or non-volatile memory, for storing data (e.g., data being processed) and/or instructions. The instructions may be executed by the one or more processors to perform the various functions of the controller 10 described herein. The one or more processors may include a microcontroller, a Digital Signal Processor (DSP), an Application Specific Integrated Circuit (ASIC), a Field Programmable Gate Array (FPGA), hard-wired logic, analog circuitry and/or a combination thereof.

The disk 60 comprises a number of radially spaced, concentric tracks 120. Each track 120 may be divided into a number of segments that are spaced circumferentially along the track 120. The segments may be used to store user data and other information. In an embodiment, the segments are sectors or wedges. The disk 60 may also comprise a plurality of angularly spaced servo wedges $22_0$-$22_N$, each of which may include embedded servo information that can be read from the disk 60 by the head 50 to determine the position of the head 50 over the disk 60. For example, each servo wedge $22_0$-$22_N$ may include a pattern of alternating magnetic transitions (servo burst), which may be read from the disk 60 by the head 50 and processed by the controller 10 to estimate the position of the head 50 relative to the disk 60. The angular spacing between the servo wedges $22_0$-$22_N$ may be uniform, as shown in the example in FIG. 1.

Figure 2:
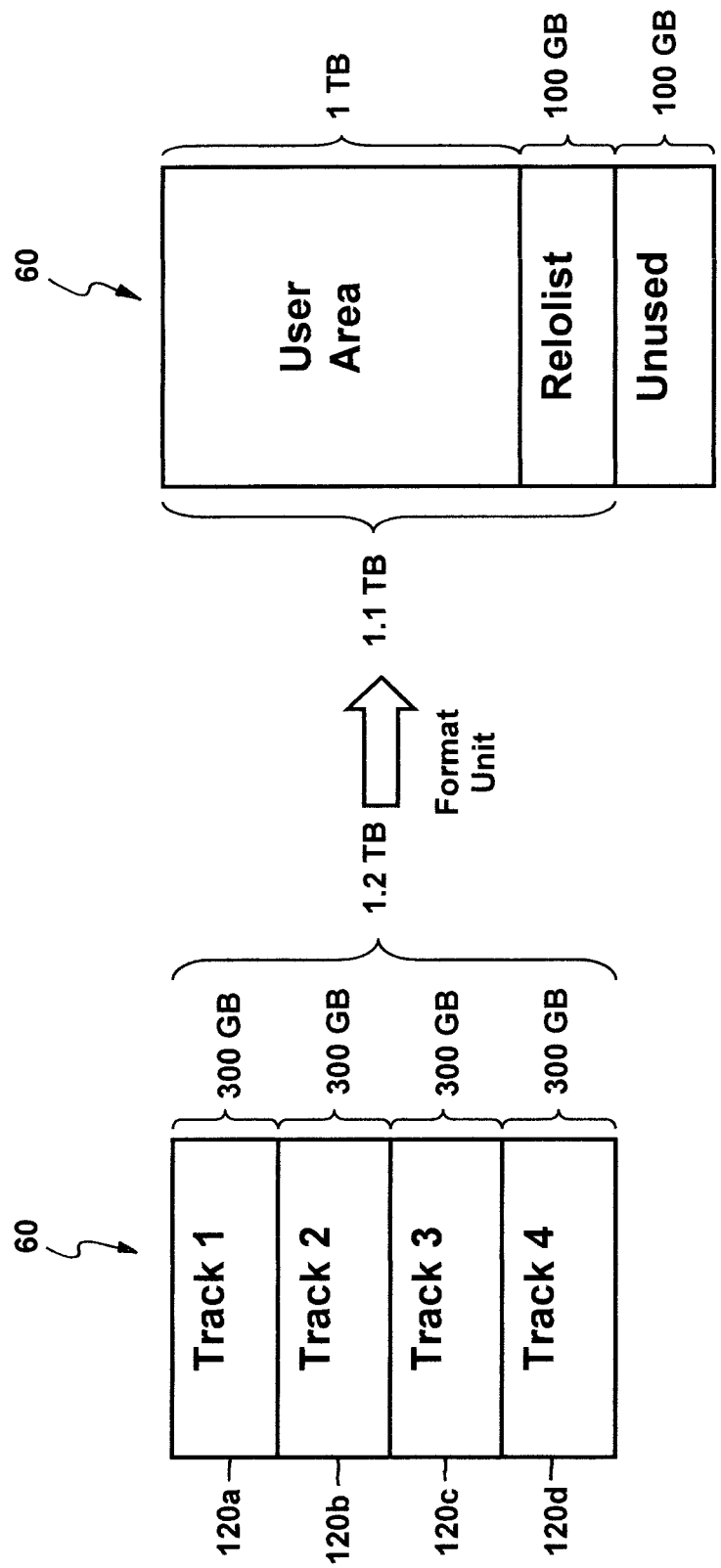
FIG. 2 depicts usable space in a disk before and after formatting of the disk according to an embodiment of the present invention.

In an embodiment, as seen in FIG. 2 tracks 120a-120d of the disk 60 are formatted to form a user area, a relocation area, and an unused area. As can be seen in FIG. 2, the disk 60 includes 1.2 TB of usable space which can be divided such that the user area includes 1 TB of space, the relocation area includes 100 GB of space, and the unused area includes 100 GB of space.

Figure 3:
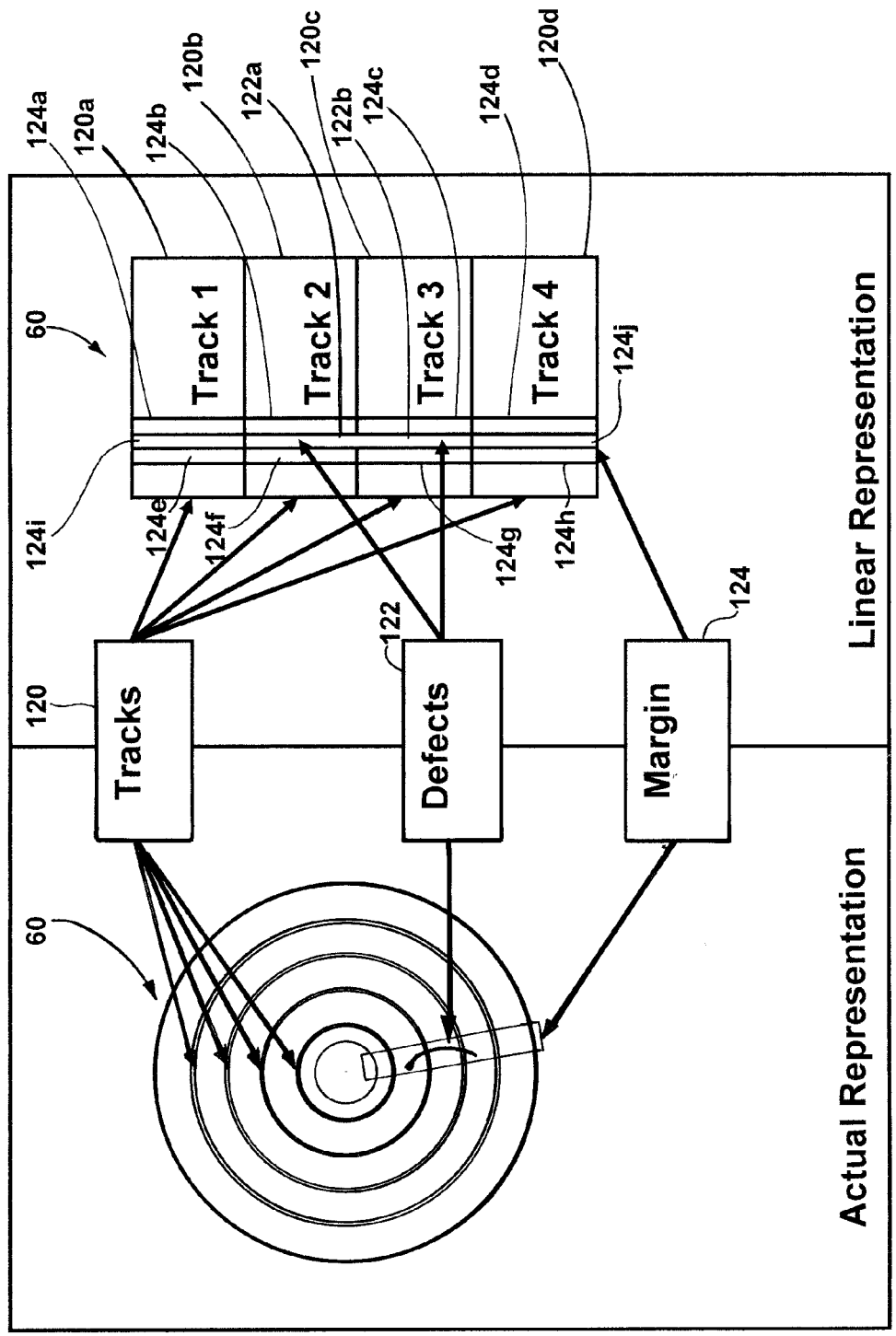
FIG. 3 depicts an actual and linear representation of a disk having defective segments and unusable segments corresponding to the defective segments according to an embodiment of the present invention.
Figure 4:
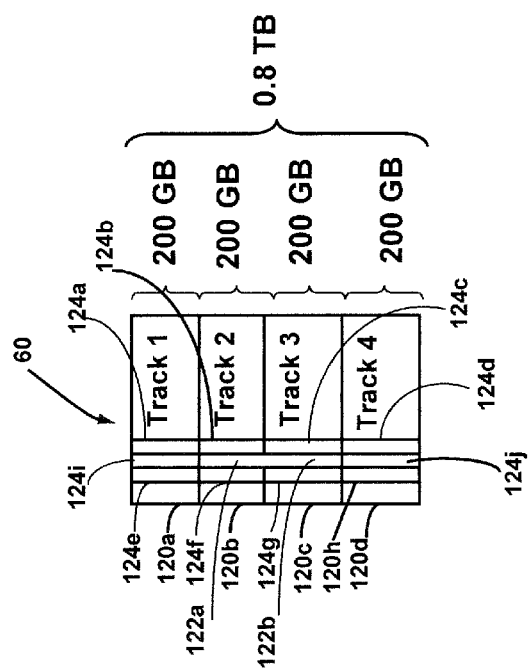
FIG. 4 depicts tracks which have defective segments and unusable segments corresponding to the defective segments according to an embodiment of the present invention.

Prior to formatting the disk 60, as seen in an embodiment in FIG. 3, defective segments 122, such as the defective segments 122a and 122b for the tracks 120a-120d are detected by the controller 10. Furthermore, the controller 10 can determine unusable segments, such as the unusable segments 124a-124j corresponding to the defective segments 122a and 122b. In an embodiment, as seen in FIG. 4, the defective segments 122a and 122b, and the unusable segments 124a-124j reduce a usable space of the disk 60 from 1.2 TB to 0.8 TB. In some situations, the defective segments 122a and 122b, and the unusable segments 124a-124j exceed a maximum defective space amount. Thus, the disk 60 may be unusable if, for example, 1 TB of usable space was required and only 0.8 TB of usable space was available.

Figure 5:
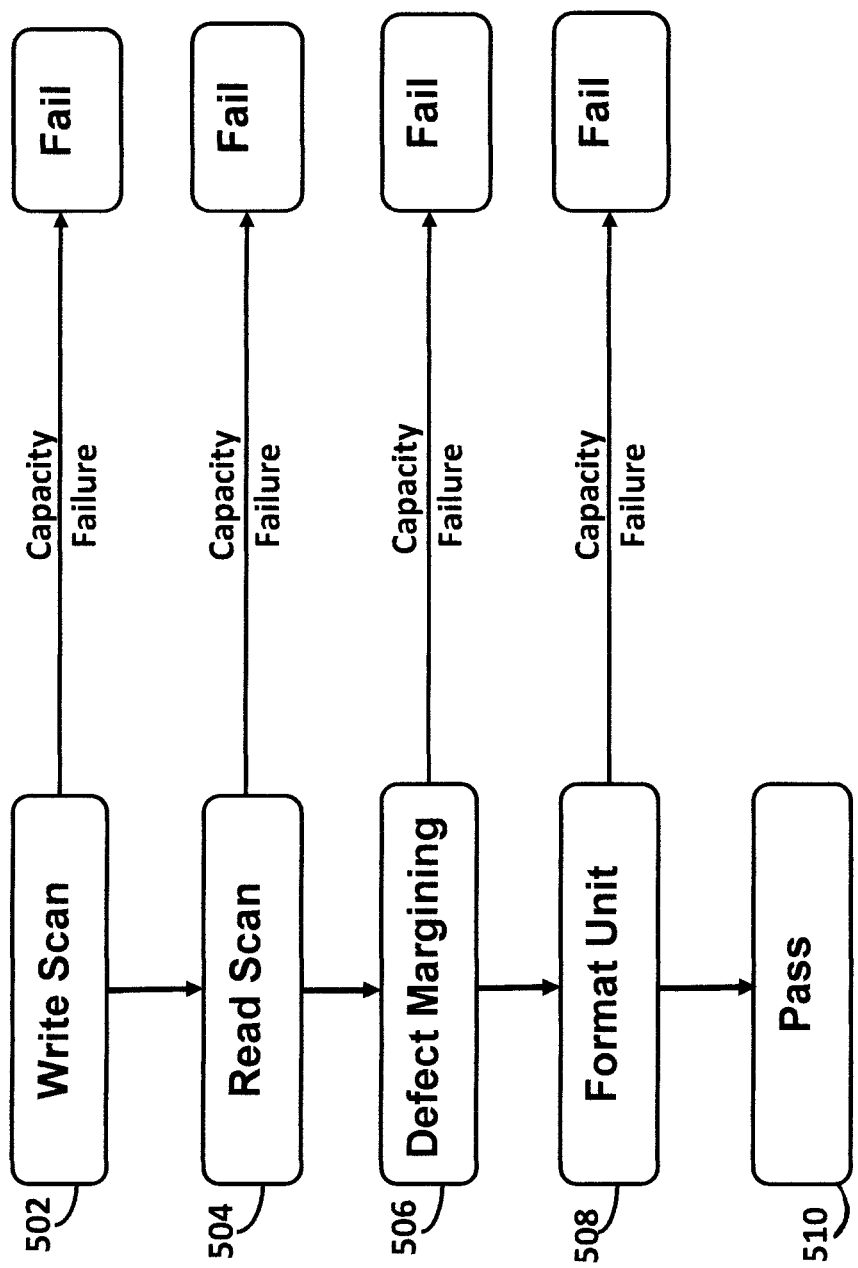
FIG. 5 is a process according to an embodiment of the present invention.

In an embodiment, as seen in FIG. 5, the controller 10 performs a process to determine whether there is a capacity failure in the disk 60. In Step 502, the controller 10 performs a write scan process on the disk 60. If during the write scan process the disk 60 does not have sufficient capacity, the disk fails and the controller 10 can transmit a storage capacity error signal to the test system. In Step 504, the controller 10 performs a read scan process on the disk 60. If during the read scan process the disk 60 does not have sufficient capacity, the disk 60 fails and the controller 10 can transmit the storage capacity error signal to the test system. In an embodiment, the write scan process in Step 502 and the read scan process in Step 504 are part of a defect management process, which will be described in more detail below.

In Step 506, the controller 10 performs a defect margining process on the disk 60, which will be described in more detail below. If during the defect margining process the disk 60 does not have sufficient capacity, the disk 60 fails and the controller 10 can transmit the storage capacity error signal to the test system. In Step 508, the controller 10 performs a formatting process on the disk 60. If during the formatting process the disk 60 does not have sufficient capacity, the disk 60 fails and the controller 10 can transmit the storage capacity error signal to the test system. If the disk 60 passes the tests in Steps 502-508, then the disk 60 passes and does not have a storage capacity error. In an embodiment, even if the disk fails, the controller 10 continues with the subsequent processes to provide failure analysis. Although in some embodiments the controller is described as transmitting a storage capacity error signal to the test system upon detection of a capacity failure condition, in some embodiments the controller may perform other actions (e.g., storing an indication) in place of, or in addition to, sending the storage capacity error signal. In other embodiments, the controller may send different signal(s) to one or more systems.

As previously noted, in an embodiment, the controller 10 performs a defect management process on the segments in the disk 60 as shown in FIG. 1B. In Step 102, the controller 10 tests the plurality of segments for defects. For example, as shown in an embodiment in FIG. 9, the controller 10 tests the segments in the tracks 120a-120d.

Figures 9, 10, 11:
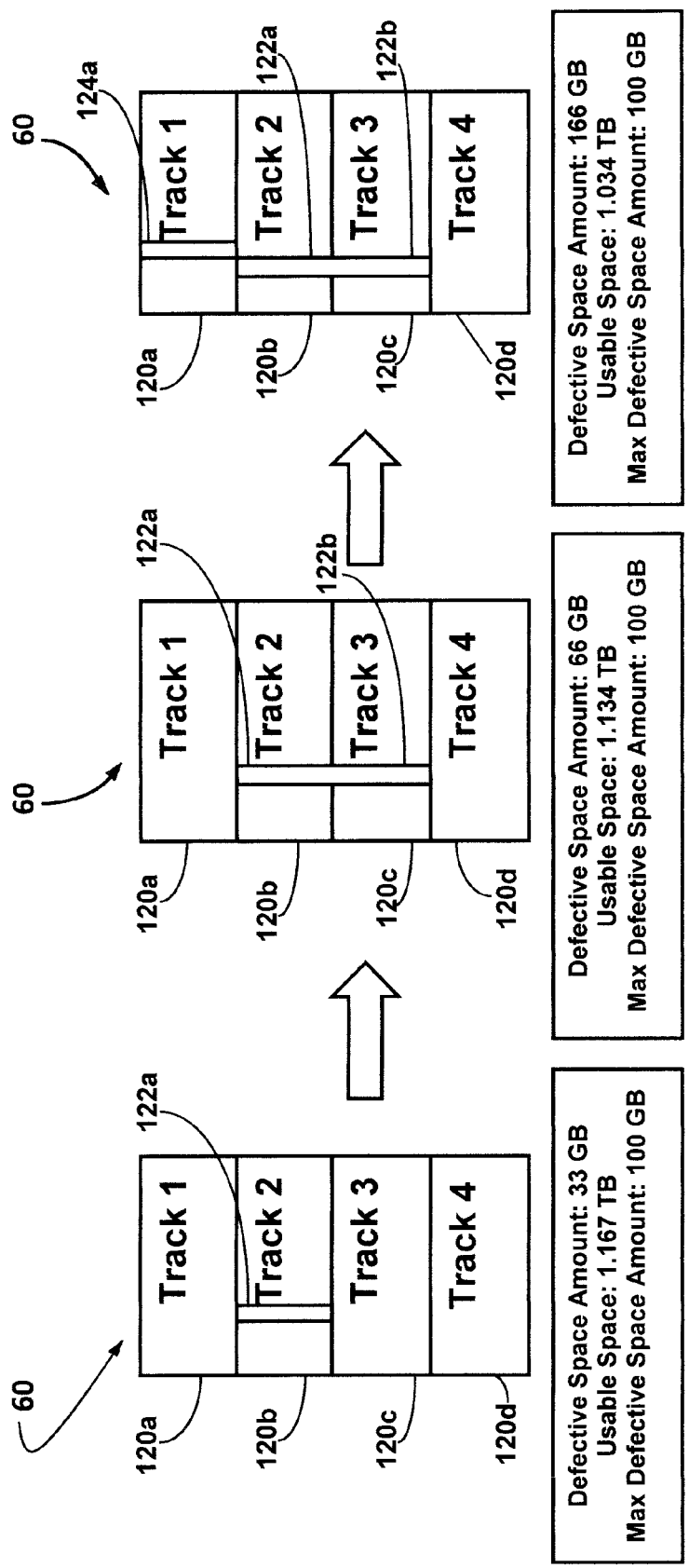
FIG. 9 depicts tracks on a disk with defective segments according to an embodiment of the present invention.
FIG. 10 depicts tracks on a disk with multiple defective segments according to an embodiment of the present invention.
FIG. 11 depicts tracks on a disk with multiple defective segments and an unusable segment corresponding to a defective segment according to an embodiment of the present invention.

In Step 104, the controller 10 detects a defect in a first segment of the plurality of segments. For example, the controller 10 can detect a defect in the defective segment 122a as shown in FIG. 9. In Step 106 in FIG. 1B, the controller 10 updates the defect list to include the first segment. For example, the disk 60 can store a defect list indicating segments of the plurality of segments which have defects. The controller 10 can update the defect list to include the defective segment 122a shown in an embodiment in FIG. 9. In an embodiment, the first segment is the first detected defective segment by the controller 10. In another embodiment, the first segment is a predetermined number of defective segments detected after a first detected defective segment by the controller 10.

In Step 108 in FIG. 1B, the controller 10 determines a defective space amount based on the segments in the updated defect list. For example, the disk 60 can store a defective space amount and the controller 10 can update the defective space amount based on an amount of space used by the segments in the updated defect list. In an embodiment, as seen in FIG. 9, the defective space amount is 33 GB, which reflects an amount of space used by the segments in the updated defect list including the defective segment 122a. In an embodiment, the defective space amount is stored in other locations aside from the disk 60, such as a non-volatile memory or a volatile memory coupled to the controller 10.

In Step 110 in FIG. 1B, the controller 10 determines whether the defective space amount indicates a storage capacity error. For example, the disk 60 can store the maximum defective space amount, and the controller 10 can determine whether the defective space amount is greater than a maximum defective space amount. In an embodiment, as seen in FIG. 9, the maximum defective space amount is 100 GB and the defective space amount is 33 GB. Thus, the defective space amount is less than the maximum defective space amount. In an embodiment, the maximum defective space amount is stored in other locations aside from the disk 60, such as a memory coupled to the controller 10. It is noted that although the controller in some embodiments is described as determining whether the defective space amount is greater than a maximum defective space amount, other defective space determination methods may be used in some embodiments. For example, in some embodiments the controller may be configured to determine whether a remaining amount of non-defective (usable) space is below a minimum threshold amount.

In Step 112 in FIG. 1B, the controller 10 transmits a storage capacity error signal to the test system when the defective space amount indicates the storage capacity error. In an embodiment, as seen in FIG. 9, the defective space amount is not greater than the maximum defective space amount, so the controller 10 would not transmit the storage capacity error signal to the test system. However, if the defective space amount was greater than the maximum defective space amount, the controller 10 would transmit the storage capacity error to the test system.

In Step 114 in FIG. 1B, when the defective space amount does not indicate the storage capacity error, the controller 10 continues to test the plurality of segments for defects until the defective space amount indicates the storage capacity error or all of the plurality of segments have been tested. For example, when the defective space amount is not greater than the maximum defective space amount, the controller 10 can continue to test the remaining untested segments in the disk 60 until the defective space amount is greater than the maximum defective space amount or all of the segments have been tested. Otherwise, if the defective space amount is greater than the maximum defective space amount, the controller 10 will not continue to test the plurality of segments in the disk 60.

Figure 6:
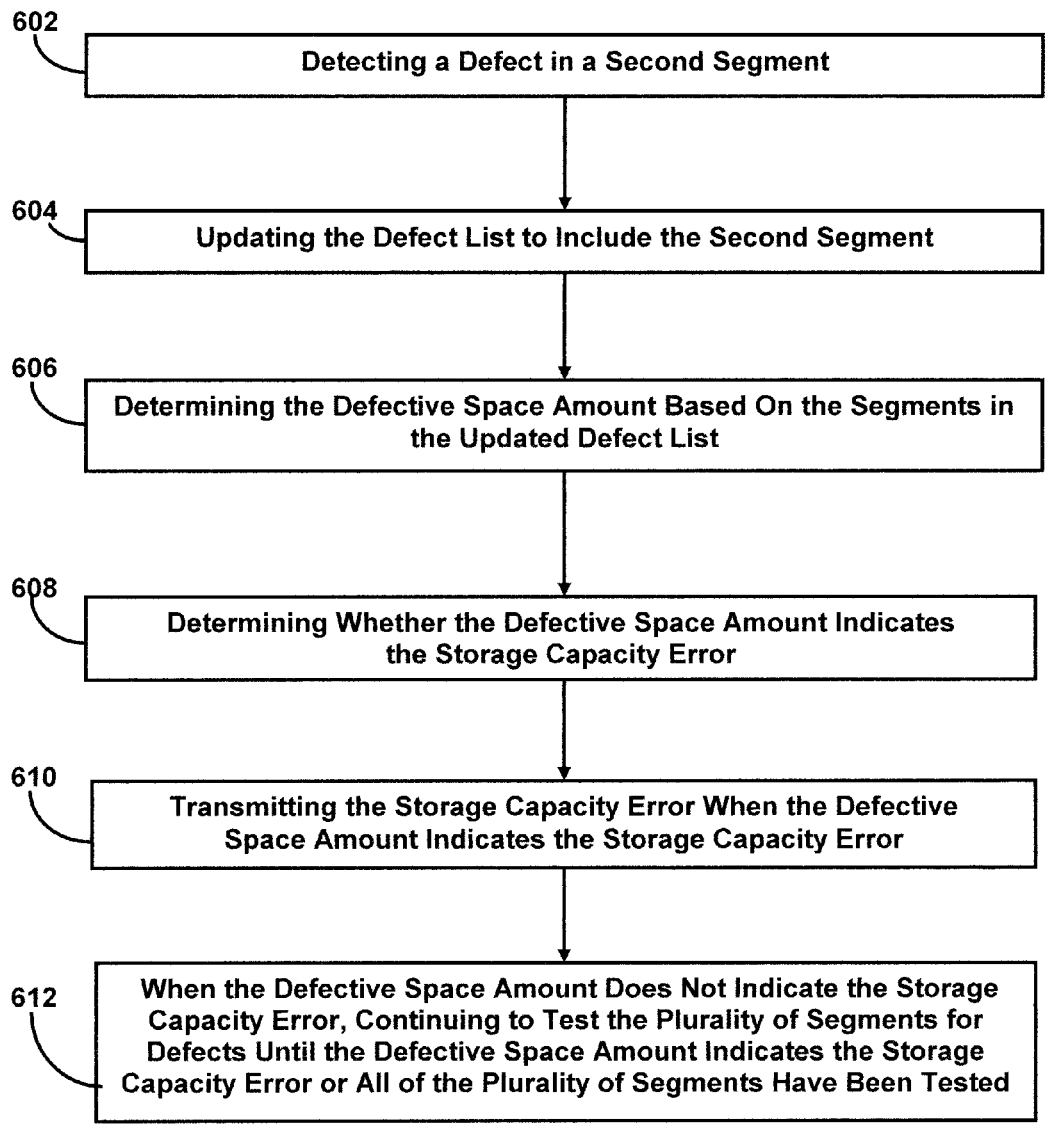
FIG. 6 depicts a defect management process according to an embodiment of the present invention.

In an embodiment, the defect management process further includes the process disclosed in FIG. 6. In Step 602, the controller 10 detects a defect in a second segment. For example, in an embodiment shown in FIG. 10, the controller 10 detects a defect in the defective segment 122b. In an embodiment, the second segment is a first defective segment after the first segment. In another embodiment, the second segment is a predetermined number of detected defective segments after the first segment in the defect list. For example, the second segment can be one or more defective segments detected by the controller 10 after the first segment.

In Step 604 in FIG. 6, the controller 10 updates the defect list to include the second segment. For example, the controller 10 can update the defect list to include the defective segment 122b. In Step 606, the controller 10 determines the defective space amount based on the segments in the updated defect list. For example, the controller 10 can determine the defective space amount based on the amount of space used by the segments in the updated defect list. In an embodiment, as seen in FIG. 10, the defective space amount is 66 GB, which reflects an amount of space used by the segments in the updated defect list including the defective segment 122*b* in addition to the defective segment 122*a*.

In Step 608 in FIG. 6, the controller 10 determines whether the defective space amount indicates the storage capacity error. In an embodiment, as seen in FIG. 10, the maximum defective space amount is 100 GB and the defective space amount is 66 GB. Thus, the defective space amount is not greater than the maximum defective space amount.

In Step 610 in FIG. 6, the controller 10 transmits the storage capacity error signal to the test system when the defective space amount indicates the storage capacity error. In an embodiment, as seen in FIG. 10, the controller 10 would not transmit the storage capacity error signal to the test system because the defective space amount is not greater than the maximum defective space amount.

In Step 612 in FIG. 6, when the defective space amount does not indicate the storage capacity error, the controller 10 continues to test the plurality of segments for defects until the defective space amount indicates the storage capacity error or all of the plurality of segments have been tested. Otherwise, if the defective space amount does indicate the storage capacity error, the controller 10 will not continue to test the plurality of segments in the disk 60.

Figure 7:
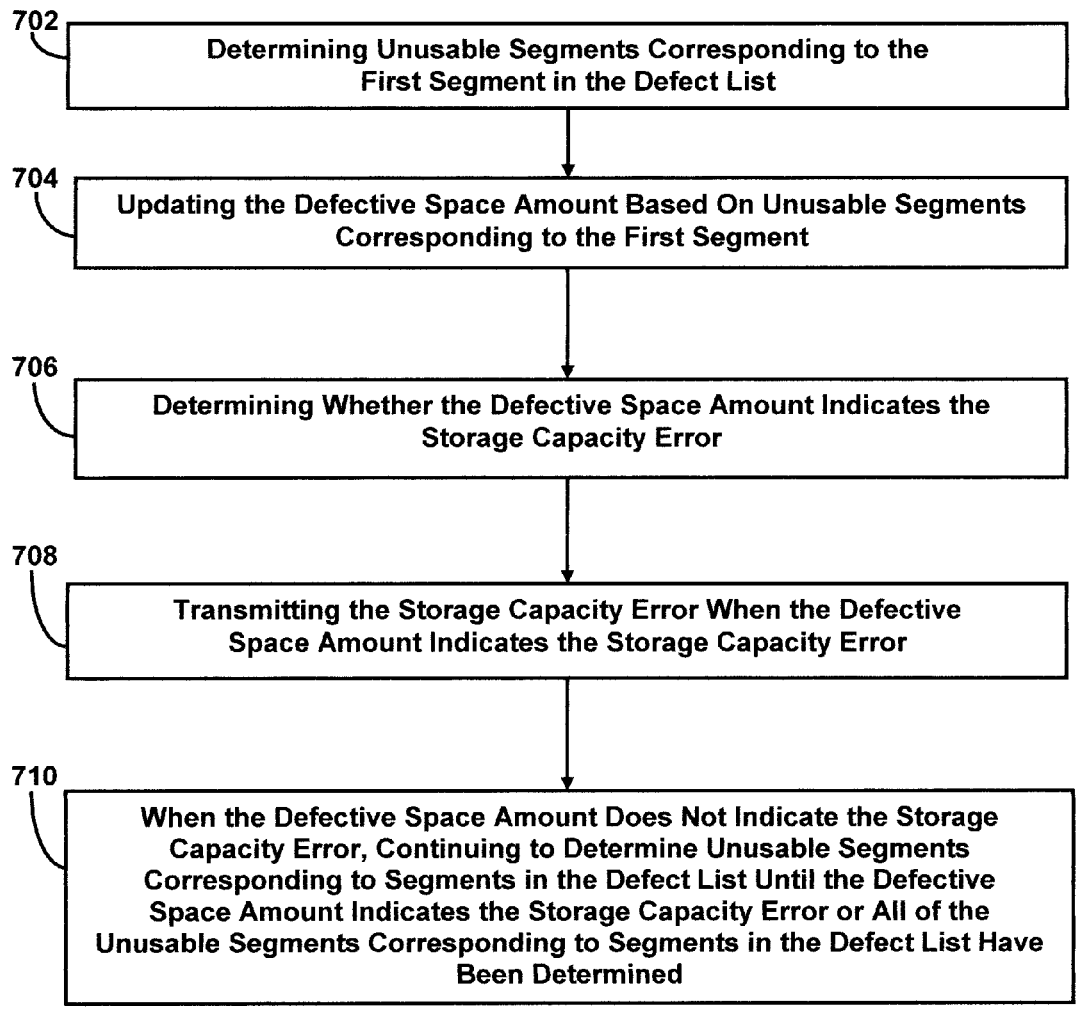
FIG. 7 depicts a defect margining process according to an embodiment of the present invention.

In an embodiment, the controller 10 performs a defect margining process on the plurality of segments in the disk 60 as shown in FIG. 7. In an embodiment, the controller 10 performs the defect margining process after determining that there is no storage capacity error based on the defective space amount when performing the defect management process.

In Step 702, the controller 10 determines unusable segments corresponding to the first segment in the defect list. For example, in an embodiment seen in FIG. 11, the controller 10 determines unusable segments such as the unusable segment 124*a* corresponding to the defective segment 122*a*. In an embodiment, the first segment is a first defective segment in the defect list. In another embodiment, the first segment is a predetermined number of defective segments after a first defective segment in the defect list. In an embodiment, the unusable segments corresponding to the first segment are added to the defect list. In another embodiment, the unusable segments corresponding to the first segment are added to another list different from the defect list. In an embodiment, the unusable segments could be determined for not just the first segment, but a first cluster of segments including the first segment and other defective segments in the defect list located near each other. For example, unusable segments 124*a*-124*j* could be determined for a cluster of segments including the defective segments 122*a* and 122*b* as shown in FIG. 3.

In Step 704 in FIG. 7, the controller 10 updates the defective space amount based on the unusable segments corresponding to the first segment. For example, the controller 10 can update the defective space amount based on an amount of space used by the unusable segments such as the unusable segment 124*a* corresponding to the defective segment 122*a*. In an embodiment, as seen in FIG. 11, the defective space amount is 166 GB, which reflects an amount of space used by the segments in the updated defect list including the unusable segment 124*a* in addition to the defective segments 122*a* and 122*b*. In an embodiment, the defective space amount is updated based on not just a single unusable segment, but a plurality of unusable segments near each other. For example, the defective space amount can be updated based on not just the segment 124*a* but additional segments near the segment 124*a* such as the segments 124*e* and 124*i* (FIG. 3).

In Step 706 in FIG. 7, the controller 10 determines whether the defective space amount indicates the storage capacity error. In an embodiment, as seen in FIG. 11, the maximum defective space amount is 100 GB and the defective space amount is 166 GB. Thus, the defective space amount is greater than the maximum defective space amount.

In Step 708 in FIG. 7, the controller 10 transmits the storage capacity error signal to the test system when the defective space amount indicates the storage capacity error. In an embodiment, as seen in FIG. 11, the controller 10 transmits the storage capacity error signal to the test system because the defective space amount is greater than the maximum defective space amount. However, if the defective space amount is not greater than the maximum defective space amount, then the controller 10 would not transmit the storage capacity error signal to the test system.

In Step 710 in FIG. 7, when the defective space amount does not indicate the storage capacity error, the controller 10 continues to determine unusable segments corresponding to segments in the defect list until the defective space amount indicates the storage capacity error or all of the unusable segments corresponding to segments in the defect list have been determined. In an embodiment, in FIG. 11, the controller 10 would not continue to determine unusable segments corresponding to segments in the defect list because the defective space amount is greater than the maximum defective space amount. However, if the defective space amount was less than the maximum defective space amount, the controller 10 would continue to determine unusable segments corresponding to segments in the defect list until the defective space amount is greater than the maximum defective space amount or all of the unusable segments corresponding to segments in the defect list have been determined.

Figure 8:
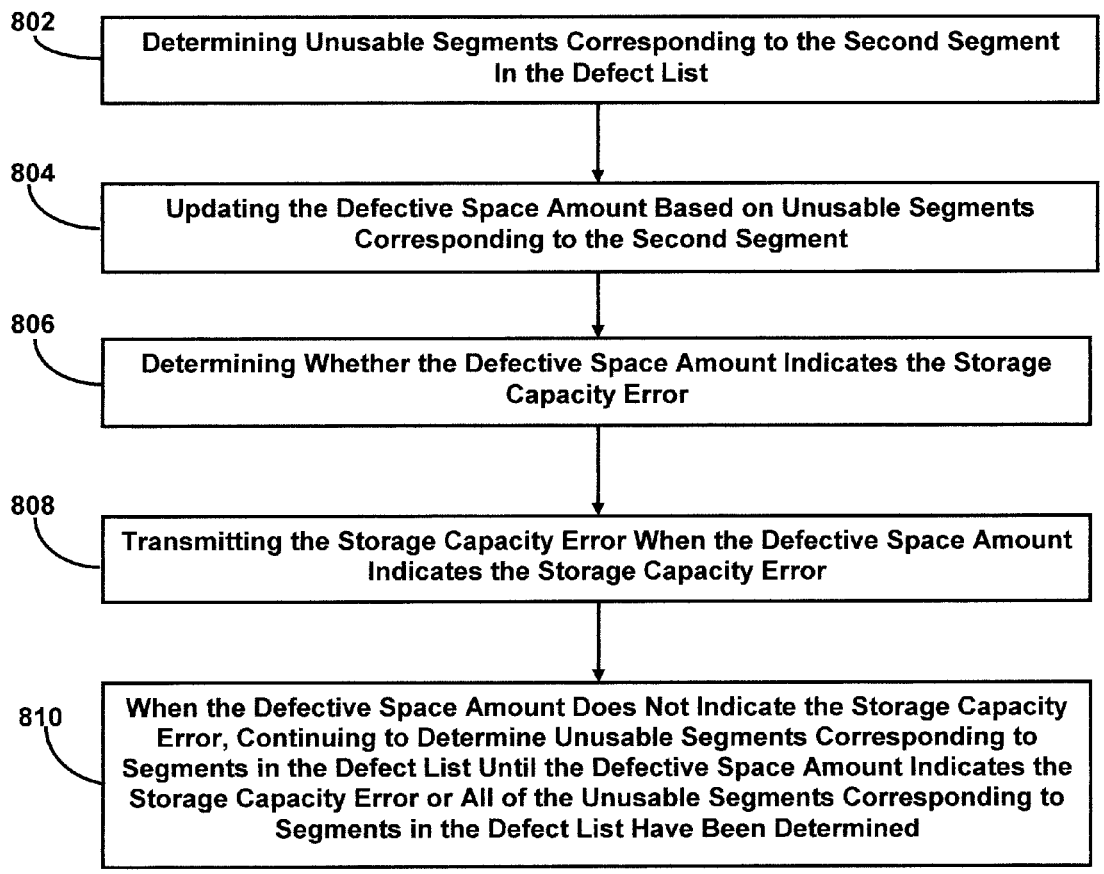
FIG. 8 depicts a defect margining process according to an embodiment of the present invention.

In an embodiment, the defect margining process performed by the controller 10 further includes the process shown in FIG. 8. In Step 802, the controller 10 determines unusable segments corresponding to the second segment in the defect list. For example, if the defective space amount is not greater than the maximum defective space amount after determining the unusable segments corresponding to the defective segment 122*a*, the controller 10 can determine unusable segments corresponding to the defective segment 122*b* in FIGS. 3 and 4. In an embodiment, the second segment is a first defective segment after the first segment in the defect list. In another embodiment, the second segment is a predetermined number of defective segments after the first segment in the defect list. In an embodiment, the unusable segments corresponding to the second segment are added to the defect list. In another embodiment, the unusable segments corresponding to the second segment are added to another list different from the defect list. In an embodiment, the unusable segments could be determined for not just the second segment, but a second cluster of segments including the second segment and other defective segments in the defect list located near each other. For example, unusable segments 124*a*-124*j* could be determined for a cluster of segments including the defective segments 122*a* and 122*b* as shown in FIG. 3.

In Step 804 in FIG. 8, the controller 10 updates the defective space amount based on the unusable segments corresponding to the second segment. For example, the controller 10 can update the defective space amount based on an amount of space used by the unusable segments corresponding to the defective segment 122*b*. In an embodiment, the defective space amount is updated based on not just a single unusable segment, but a plurality of unusable segments near each other.

In Step 806, the controller 10 determines whether the defective space amount indicates the storage capacity error. In Step 808, the controller 10 transmits the storage capacity error signal to the test system when the defective space amount indicates the storage capacity error.

In Step 810, when the defective space amount does not indicate the storage capacity error, the controller 10 continues to determine unusable segments corresponding to segments in the defect list until the defective space amount indicates the storage capacity error or all of the unusable segments corresponding to segments in the defect list have been determined. For example, when the defective space amount is not greater than the maximum defective space amount, the controller 10 can continue to determine unusable segments corresponding to segments in the defect list until the defective space amount is greater than the maximum defective space amount or all of the unusable segments corresponding to segments in the defect list have been determined.

In an embodiment, the controller 10 also performs a formatting process on a non-volatile media after determining that there is no storage capacity error based on the defective space amount when performing the defect management process and the defect margining process disclosed above. Furthermore, the controller 10 can be configured to determine when there is a storage capacity error based on the defect space amount during the formatting process on the non-volatile media.

In an embodiment, the controller 10 determines whether the defective space amount indicates the storage capacity error using a usable space amount instead of the maximum defective space amount. For example, the controller 10 can determine the usable space amount using the defective space amount and compare the usable space amount to a minimum usable space amount to determine if there is sufficient space in the disk 60. When the usable space amount is greater than the minimum usable space amount, there is sufficient space in the disk 60 and there is no storage capacity error. However, when the usable space amount is not greater than the minimum usable space amount, then there is the storage capacity error for the disk 60.

In an embodiment, as seen in FIG. 12A, a non-volatile media 160 is seen in a data storage device 900. In an embodiment, the non-volatile media 160 in FIG. 12A includes the disk 60 or a non-volatile semiconductor memory, e.g., NAND flash memory. In another embodiment, the non-volatile media 160 includes both the disk 60 and the non-volatile semiconductor memory. The data storage device 900 is similar to the data storage device 100 except for the inclusion of the non-volatile media 160, and thus further description will be omitted. Furthermore, the process shown in FIG. 12B is similar to the process in FIG. 1B and the description will not be repeated.

Those of ordinary skill would appreciate that the various illustrative logical blocks, modules, and algorithm steps described in connection with the examples disclosed herein may be implemented as electronic hardware, computer software, or combinations of both. Furthermore, the present invention can also be embodied on a machine readable medium causing a processor or computer to perform or execute certain functions.

To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosed apparatus and methods.

The steps of a method or algorithm described in connection with the examples disclosed herein may be embodied directly in hardware, in a software module executed by a processor, or in a combination of the two. The steps of the method or algorithm may also be performed in an alternate order from those provided in the examples. Certain steps may be omitted, divided into additional steps, and/or combined into fewer steps. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an Application Specific Integrated Circuit (ASIC). The ASIC may reside in a wireless modem. In the alternative, the processor and the storage medium may reside as discrete components in the wireless modem.

The previous description of the disclosed examples is provided to enable any person of ordinary skill in the art to make or use the disclosed methods and apparatus. Various modifications to these examples will be readily apparent to those skilled in the art, and the principles defined herein may be applied to other examples without departing from the spirit or scope of the disclosed method and apparatus. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A data storage device comprising:
a non-volatile media including a plurality of segments, and configured to store a defect list indicating segments of the plurality of segments which have defects; and
a controller configured to perform a defect management process by:
testing the plurality of segments for defects;
detecting a defect in a first segment of the plurality of segments;
updating the defect list to include the first segment;
determining a defective space amount based on the segments in the updated defect list;
determining whether the defective space amount indicates a storage capacity error;
transmitting a storage capacity error signal to a test system when the defective space amount indicates the storage capacity error; and
when the defective space amount does not indicate the storage capacity error, continuing to test the plurality of segments for defects until the defective space amount indicates the storage capacity error or all of the plurality of segments have been tested.

2. The data storage device of claim 1 further comprising detecting a defect in a second segment;
updating the defect list to include the second segment;

determining the defective space amount based on the amount of space used by the segments in the updated defect list;

determining whether the defective space amount indicates the storage capacity error;

transmitting the storage capacity error signal to the test system when the defective space amount indicates the storage capacity error; and when the defective space amount does not indicate the storage capacity error, continuing to test the plurality of segments for defects until the defective space amount indicates the storage capacity error or all of the plurality of segments have been tested.

3. The data storage device of claim 2 wherein the second segment is a first defective segment after the first segment.

4. The data storage device of claim 2 wherein the second segment is a predetermined number of defective segments detected after the first segment.

5. The data storage device of claim 1 wherein the first segment is a first detected defective segment.

6. The data storage device of claim 1 wherein the first segment is a predetermined number of defective segments detected after a first detected defective segment.

7. The data storage device of claim 1 wherein the defect management process is a write scan process.

8. The data storage device of claim 1 wherein the defect management process is a read scan process.

9. The data storage device of claim 1 wherein the controller is further configured to perform a defect margining process after determining that there is no storage capacity error based on the defective space amount when performing the defect management process.

10. The data storage device of claim 9 wherein the defect margining process includes:

determining unusable segments corresponding to the first segment;

updating the defective space amount based on the unusable segments corresponding to the first segment;

determining whether the defective space amount indicates the storage capacity error;

transmitting the storage capacity error signal to the test system when the defective space amount indicates the storage capacity error; and when the defective space amount does not indicate the storage capacity error, continuing to determine unusable segments corresponding to segments in the defect list until the defective space amount indicates the storage capacity error or all of the unusable segments corresponding to segments in the defect list have been determined.

11. The data storage device of claim 10 wherein the defect margining process further includes:

determining unusable segments corresponding to a second segment;

updating the defective space amount based on the unusable segments corresponding to the second segment;

determining whether the defective space amount indicates the storage capacity error;

transmitting the storage capacity error signal to the test system when the defective space amount indicates the storage capacity error; and when the defective space amount does not indicate the storage capacity error, continuing to determine unusable segments corresponding to segments in the defect list until the defective space amount indicates the storage capacity error or all of the unusable segments corresponding to segments in the defect list have been determined.

12. The data storage device of claim 11 wherein the second segment is a first defective segment after the first segment in the defect list.

13. The data storage device of claim 11 wherein the second segment is a predetermined number of defective segments after the first segment in the defect list.

14. The data storage device of claim 10 wherein the first segment is a first defective segment in the defect list.

15. The data storage device of claim 10 wherein the first segment is a predetermined number of defective segments after a first defective segment in the defect list.

16. The data storage device of claim 10 wherein the controller is further configured to perform a formatting process on the non-volatile media after determining that there is no storage capacity error based on the defective space amount when performing the defect management process and the defect margining process.

17. The data storage device of claim 16 wherein the controller is further configured to determine when there is the storage capacity error based on the defective space amount during the formatting process on the non-volatile media.

18. The data storage device of claim 1 wherein the non-volatile media is a rotatable disk.

19. The data storage device of claim 1 wherein the non-volatile media is a non-volatile semiconductor memory.

20. A method for determining a storage capacity error in a non-volatile media including a plurality of segments, and configured to store a defect list indicating segments of the plurality of segments which have defects, comprising:

performing a defect management process by:

testing the plurality of segments for defects;

detecting a defect in a first segment of the plurality of segments;

updating the defect list to include the first segment;

determining a defective space amount based on the segments in the updated defect list;

determining whether the defective space amount indicates a storage capacity error;

transmitting a storage capacity error signal to a test system when the defective space amount indicates the storage capacity error; and when the defective space amount does not indicate the storage capacity error, continuing to test the plurality of segments for defects until the defective space amount indicates the storage capacity error or all of the plurality of segments have been tested.

21. The method of claim 20 further comprising detecting a defect in a second segment;

updating the defect list to include the second segment;

determining the defective space amount based on the amount of space used by the segments in the updated defect list;

determining whether the defective space amount indicates the storage capacity error;

transmitting the storage capacity error signal to the test system when the defective space amount indicates the storage capacity error; and when the defective space amount does not indicate the storage capacity error, continuing to test the plurality of segments for defects until the defective space amount indicates the storage capacity error or all of the plurality of segments have been tested.

22. The method of claim 21 wherein the second segment is a first defective segment after the first segment.

23. The method of claim 21 wherein the second segment is a predetermined number of defective segments detected after the first segment.

24. The method of claim 20 wherein the first segment is a first detected defective segment.

25. The method of claim 20 wherein the first segment is a predetermined number of defective segments detected after a first detected defective segment.

26. The method of claim 20 wherein the defect management process is a write scan process.

27. The method of claim 20 wherein the defect management process is a read scan process.

28. The method of claim 20 further comprising performing a defect margining process after determining that there is no storage capacity error based on the defective space amount when performing the defect management process.

29. The method of claim 28 wherein the step of performing the defect margining process includes:
   determining unusable segments corresponding to the first segment;
   updating the defective space amount based on the unusable segments corresponding to the first segment;
   determining whether the defective space amount indicates the storage capacity error;
   transmitting the storage capacity error signal to the test system when the defective space amount indicates the storage capacity error; and
   when the defective space amount does not indicate the storage capacity error, continuing to determine unusable segments corresponding to segments in the defect list until the defective space amount indicates the storage capacity error or all of the unusable segments corresponding to segments in the defect list have been determined.

30. The method of claim 29 wherein the step of performing the defect margining process further includes:
   determining unusable segments corresponding to a second segment;
   updating the defective space amount based on the unusable segments corresponding to the second segment;
   determining whether the defective space amount indicates the storage capacity error;
   transmitting the storage capacity error signal to the test system when the defective space amount indicates the storage capacity error; and
   when the defective space amount does not indicate the storage capacity error, continuing to determine unusable segments corresponding to segments in the defect list until the defective space amount indicates the storage capacity error or all of the unusable segments corresponding to segments in the defect list have been determined.

31. The method of claim 30 wherein the second segment is a first defective segment after the first segment in the defect list.

32. The method of claim 30 wherein the second segment is a predetermined number of defective segments after the first segment in the defect list.

33. The method of claim 29 wherein the first segment is a first defective segment in the defect list.

34. The method of claim 29 wherein the first segment is a predetermined number of defective segments after a first defective segment in the defect list.

35. The method of claim 20 further comprising performing a formatting process on the non-volatile media after determining that there is no storage capacity error based on the defective space amount when performing the defect management process.

36. The method of claim 35 further comprising determining when there is the storage capacity error based on the defective space amount during the formatting process on the non-volatile media.

37. The method of claim 20 wherein the non-volatile media is a rotatable disk.

38. The method of claim 20 wherein the non-volatile media is a non-volatile semiconductor memory.

* * * * *